United States Patent [19]
Kaneko et al.

[11] Patent Number: 5,807,938
[45] Date of Patent: Sep. 15, 1998

[54] CATALYST FOR OLEFIN POLYMERIZATION AND PROCESS FOR PRODUCING OLEFIN POLYMERS

[75] Inventors: Toshiyuki Kaneko; Morihiko Sato, both of Mie, Japan

[73] Assignee: Tosoh Corporation, Yamaguchi, Japan

[21] Appl. No.: 603,439

[22] Filed: Feb. 20, 1996

[30] Foreign Application Priority Data

Feb. 20, 1995 [JP] Japan .................................. 7-030933

[51] Int. Cl.$^6$ ................................ C08F 4/02; C08F 10/00
[52] U.S. Cl. ........................ 526/160; 502/102; 502/103; 502/120; 502/152; 526/128; 526/129; 526/352; 526/904; 526/943
[58] Field of Search ...................................... 502/120, 109, 502/103, 152, 102; 526/129, 160

[56] References Cited

U.S. PATENT DOCUMENTS

| | | | |
|---|---|---|---|
| 5,241,025 | 8/1993 | Hlatky et al. ............................. | 526/129 |
| 5,455,214 | 10/1995 | Furtek et al. ............................. | 502/109 |
| 5,466,649 | 11/1995 | Jejelowo ................................. | 526/129 |
| 5,643,847 | 7/1997 | Walzer .................................... | 526/160 |

FOREIGN PATENT DOCUMENTS

| | | |
|---|---|---|
| WO-09882 | 7/1991 | WIPO . |
| WO9109882 | 11/1991 | WIPO . |
| WO-11172 | 6/1993 | WIPO . |
| WO9311172 | 6/1993 | WIPO . |
| WO-03506 | 2/1994 | WIPO . |
| WO9403506 | 2/1994 | WIPO . |

*Primary Examiner*—Edward J. Smith
*Attorney, Agent, or Firm*—Sughrue, Mion, Zinn, Macpeak & Seas, PLLC

[57] ABSTRACT

A catalyst for olefin polymerization obtainable by contacting:
(a) a transition metal compound containing a transition metal of the Group 4 of the Periodic Table,
(b) an organometallic compound, and
(c) a solid catalyst component comprising a carrier and an ionized ionic compound capable of forming a stable anion on reaction with a transition metal compound, wherein the ionized ionic compound comprises a cationic component and an anionic component and the cationic component is fixed on the surface of the carrier. The catalyst system of the invention enables production of olefin polymers with excellent physical properties at good productivity without causing contamination of a polymerization vessel.

8 Claims, No Drawings

CATALYST FOR OLEFIN POLYMERIZATION AND PROCESS FOR PRODUCING OLEFIN POLYMERS

FIELD OF THE INVENTION

This invention relates to a catalyst suitable to produce olefin polymers excellent in processability and having a narrow composition distribution in a satisfactory shape, and to a process for producing an olefin polymer using the catalyst.

BACKGROUND OF THE INVENTION

Ethylene polymerization in the presence of a catalyst system comprising a metallocene and an organoaluminum compound is described in JP-A-3-197513 (the term "JP-A" as used here means an "unexamined published Japanese patent application"). Ethylene homo- or copolymerization in the presence of a zirconocene compound, an organoaluminum compound, and an organomagnesium compound is disclosed in JP-A-3-290408. In JP-A-58-19309, Kaminsky et al. disclose that a catalyst system comprising a metallocene and methylaluminoxane shows a high activity in polymerization of olefins including propylene. Attempts to conduct olefin polymerization by suspension polymerization or gas phase polymerization using a catalyst comprising a metallocene and/or methylaluminoxane supported on an inorganic oxide carrier such as silica are known as described, e.g., in JP-A-63-51407. According to the disclosures, in order to obtain polymers having industrially useful physical properties, it is necessary to use a large quantity of methylaluminoxane which is more expensive than organoaluminum compounds used in conventional Ziegler-Natta catalyst systems. Therefore these techniques are accompanied by problems in terms of cost and a large amount of aluminum remaining in the resulting polymer. It has recently been proposed to add an organoaluminum compound to an ionic metallocene catalyst to provide a catalyst exhibiting high activity in polymerization of olefins including propylene, as disclosed in JP-A-3-124706 and JP-A-3-207704. According to the disclosures, the main catalyst, ionic metallocene catalyst, is prepared by reacting a chloride of a metallocene compound with a methylating agent, such as methyllithium or methylmagnesium chloride, to form a methyl derivative of the metallocene, which is then reacted with an ionized ionic compound. The methyl derivative of the metallocene and the ionic metallocene catalyst are often instable and cannot be synthesized without requiring highly technical and complicated multiple stages. Therefore the techniques involve many problems as to purity of the catalyst, reproducibility of the catalyst preparation, and deactivation of the catalyst during storage and transfer to a polymerization vessel. An attempt to conduct olefin polymerization by suspension polymerization or gas phase polymerization using the above-mentioned catalyst comprising the ionic metallocene compound supported on an inorganic oxide carrier such as silica, is also known as described in JP-A-3-234709. However, the disclosed catalyst system does not exhibit sufficient activity. Beside, the catalyst system cannot be synthesized without requiring highly technical and complicated multiple stages because of the involvement of steps of preparing such instable compounds as a methylated metallocene compound and an ionic metallocene catalyst. On the other hand, WO92/01723 suggests propylene polymerization in the presence of a catalyst system obtained by contacting a reaction product prepared by treating a halogenated metallocene compound with an organometallic compound with a compound capable of forming a stable anion on reaction with the reaction product of the halogenated metallocene compound and the organometallic compound. Since this catalyst system is characterized by using the reaction product between a halogenated metallocene and an organoaluminum compound, it has improved stability as compared with the aforesaid ionic metallocene catalyst. The publication also has a mention of the method of using the above catalyst component as supported on a carrier. However, since the catalyst-on-carrier is prepared by impregnating a carrier with a uniform solution of the catalyst component, so that the catalyst component is apt to drop from the carrier during polymerization, which leads to deterioration of the resulting polymer in shape. It is expected that such a disadvantage would be conspicuous in slurry polymerization.

SUMMARY OF THE INVENTION

An object of the present invention is to provide a catalyst for olefin polymerization, with which an olefin polymer excellent in processability can be produced in a satisfactory shape and at good productivity in gas phase polymerization or suspension polymerization.

Another object of the present invention is to provide a process for producing an olefin polymer in the presence of the above catalyst.

As a result of extensive study, the present inventors have found that the above object of the invention is accomplished by using a catalyst system comprising a transition metal compound, an organometallic compound, and a solid catalyst component comprising a carrier and an ionized ionic compound wherein the ionized compound comprises a cationic component and an anionic component and the cationic component is fixed on the surface of the carrier.

Namely, the present invention relates to a catalyst for olefin polymerization obtainable by contacting (a) a transition metal compound containing a transition metal of the Group 4 of the Periodic Table, (b) an organometallic compound, and (c) a solid catalyst component comprising a carrier and an ionized ionic compound capable of forming a stable anion on reaction with the transition metal compound, wherein the ionized ionic compound comprises a cationic component and an anionic component and the cationic component is fixed on the surface of the carrier.

The present invention also relates to a process for producing an olefin polymer comprising polymerizing or copolymerizing an α-olefin and/or a cyclic olefin in the presence of the catalyst of the invention in a solution, suspension or gas phase at a temperature of from −60° to 280° C. under a pressure of 0.5 to 2000 bar.

DETAILED DESCRIPTION OF THE INVENTION

The transition metal compound as component (a) which contains a transition metal of the Group 4 of the Periodic Table includes those represented by formulae (1), (2), and (13) to (16) shown below.

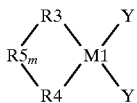
(2)

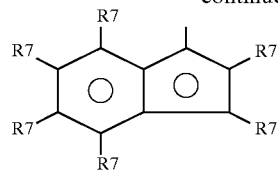
(8)

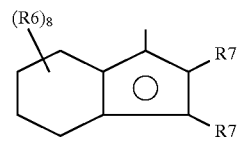
(9)

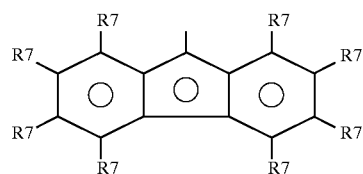
(10)

wherein $M^1$ represents a titanium atom, a zirconium atom or a hafnium atom; a plurality of Y's independently represent a hydrogen atom, a halogen atom, an alkyl group having 1 to 24 carbon atoms or an aryl, arylakyl or alkylaryl group having 6 to 24 carbon atoms (such as a hydrogen atom, halogen atoms (e.g., a fluorine atom, a chlorine atom, a bromine atom, an iodine atom), alkyl groups (e.g., methyl, ethyl, propyl, butyl, pentyl, hexyl, heptyl, octyl, nonyl, decyl, dodecyl isopropyl, isobutyl, s-butyl, t-butyl, cyclohexyl), aryl groups (e.g., phenyl, biphenyl, naphthyl), arylalkyl groups (e.g., benzyl, phenylethyl), alkylaryl groups (e.g., tolyl, xylyl, cumenyl, mesityl)); $R^1$ and $R^2$ independently represent a ligand represented by formula (3), (4), (5) or (6):

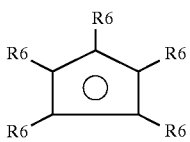
(3)

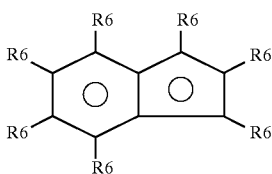
(4)

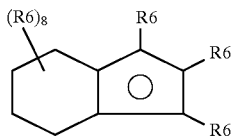
(5)

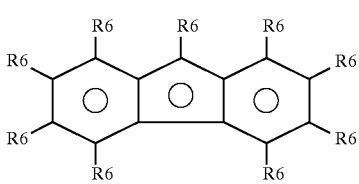
(6)

wherein a plurality of $R^6$'s independently represent a hydrogen atom, an alkyl group having 1 to 24 carbon atoms or an aryl, arylalkyl or alkylaryl group having 6 to 24 carbon atoms (e.g., a hydrogen atom, the alkyl, aryl, arylalkyl and alkylaryl groups exemplified above for Y);

the ligands $R^1$ and $R^2$ forms a sandwich structure together with $M^1$; $R^3$ and $R^4$ independently represent a ligand represented by formula (7), (8), (9) or (10):

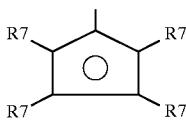
(7)

wherein a plurality of $R^7$'s independently represent a hydrogen atom, an alkyl group having 1 to 24 carbon atoms or an aryl, arylakyl or alkylaryl group having 6 to 24 carbon atoms (e.g., a hydrogen atom, the alkyl, aryl, arylalkyl and alkylaryl groups exemplified above for Y);

the ligands $R^3$ and $R^4$ forms a sandwich structure together with $M^1$; $R^5$ represents a group represented by formula (11) or (12):

(11)

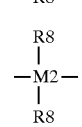
(12)

wherein two $R^8$'s independently represent a hydrogen atom, an alkyl group having 1 to 24 carbon atoms or an aryl, arylalkyl or alkylaryl group having 6 to 24 carbon atoms (e.g., the halogen atoms and the alkyl, aryl, arylalkyl and alkylaryl groups exemplified above for Y); and $M^2$ represents a silicon atom, a germanium atom or a tin atom;

the group $R^5$ serves to crosslink $R^3$ and $R^4$; and m represents an integer of 1 to 5.

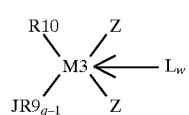
(13)

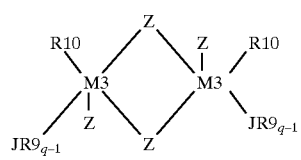
(14)

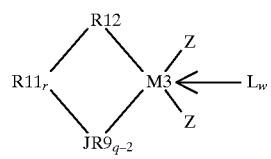
(15)

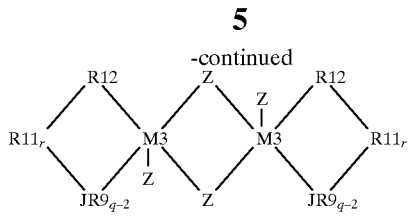(16)

wherein a plurality of $M^3$'s independently represent a titanium atom, a zirconium atom or a hafnium atom; a plurality of Z's independently represent a hydrogen atom, a halogen atom, an alkyl group having 1 to 24 carbon atoms or an aryl, arylalkyl or alkylaryl group having 6 to 24 carbon atoms (e.g., the alkyl, aryl, arylalkyl and alkylaryl groups exemplified above for Y); L represents a Lewis base; w represents a number of from 0 to 3; $JR^9_{q-1}$ and $JR^9_{q-2}$ each represent a hetero atom ligand, in which J represents the Group 15 element having a coordination number of 3 or the Group 16 element having a coordination number of 2; a plurality of $R^9$'s independently represent a hydrogen atom, a halogen atom, an alkyl or alkoxy group having 1 to 24 carbon atoms or an aryl, aryloxy, arylalkyl, arylalkoxy, alkylaryl or alkylaryloxy group having 6 to 24 carbon atoms (such as a hydrogen atom, halogen atoms (e.g., a fluorine atom, a bromine atom, an iodine atom), alkyl groups (e.g., methyl, ethyl, propyl, pentyl, hexyl, heptyl, decyl, isopropyl, isobutyl, s-butyl, t-butyl), alkoxy groups (e.g., methoxy, ethoxy, propoxy, butoxy, isopropoxy), aryl groups (e.g., phenyl, biphenyl, naphthyl), aryloxy groups (e.g., phenoxy), arylalkyl groups (e.g., benzyl, phenylethyl), arylalkoxy groups (benzyloxy), alkylaryl groups (e.g., tolyl, xylyl, cumenyl, mesityl), alkylaryloxy groups (e.g., methylphenoxy)); and q represents the coordination number of the element J; $R^{10}$ represents a ligand represented by formula (17), (18), (19) or (20):

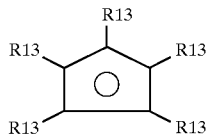(17)

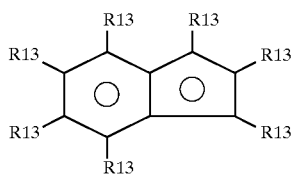(18)

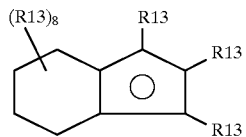(19)

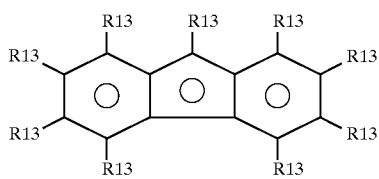(20)

wherein a plurality of $R^{13}$'s independently represent a hydrogen atom, an alkyl group having 1 to 24 carbon atoms or an aryl, arylalkyl or alkylaryl group having 6 to 24 carbon atoms (e.g., a hydrogen atom, the alkyl, aryl, arylalkyl and alkylaryl groups exemplified above for Y);
$R^{12}$ represents a ligand coordinating to $M^3$, which is represented by formula (21), (22), (23) or (24):

(21)

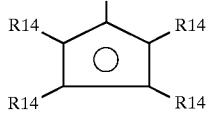(22)

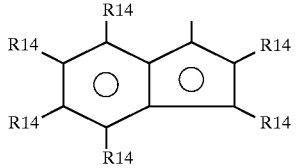(23)

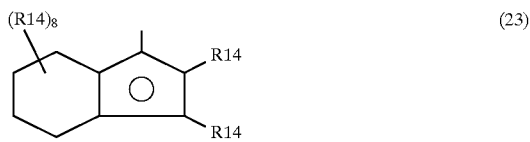(24)

wherein a plurality of $R^{14}$'s independently represent a hydrogen atom, an alkyl group having 1 to 24 carbon atoms or an aryl, arylalkyl or alkylaryl group having 6 to 24 carbon atoms (e.g., a hydrogen atom, the alkyl, aryl, arylalkyl and alkylaryl groups exemplified above for Y);
$R^{11}$ represents a group represented by formula (25) or (26):

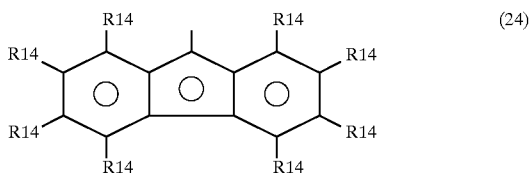(25)

(26)

wherein two $R^{15}$'s independently represent a hydrogen atom, an alkyl group having 1 to 24 carbon atoms or an aryl, arylalkyl or alkylaryl group having 6 to 24 carbon atoms (e.g., a hydrogen atom, the alkyl, aryl, arylalkyl and alkylaryl groups exemplified above for Y); and $M^4$ represents a silicon atom, a germanium atom or a tin atom;
the group $R^{11}$ serves to crosslink $R^{12}$ and $JR^9_{q-2}$; and r represents an integer of from 1 to 5.

Examples of the compounds represented by formula (1) or (2) include dichlorides, such as bis(cyclopentadienyl) titanium dichloride, bis(cyclopentadienyl)zirconium dichloride, bis(cyclopentadienyl)hafnium dichloride, bis(methylcyclopentadienyl)titanium dichloride, bis(methylcyclopentadienyl)zirconium dichloride, bis(methylcyclopentadienyl)hafnium dichloride, bis(butylcyclopentadienyl)titanium dichloride, bis(butylcyclopentadienyl)zirconium dichloride, bis(butylcyclopentadienyl)hafnium dichloride, bis(pentamethylcyclopentadienyl)titanium dichloride, bis(pentamethylcyclopentadienyl)zirconium dichloride, bis(pentamethylcyclopentadienyl)hafnium dichloride, bis(indenyl)titanium dichloride, bis(indenyl)zirconium dichloride, bis(indenyl)hafnium dichloride, methylenebis(cyclopentadienyl)titanium dichloride, methylenebis(cyclopentadienyl)zirconium dichloride, methylenebis(cyclopentadienyl)hafnium dichloride, methylenebis (methylcyclopentadienyl)titanium dichloride, methylenebis(methylcyclopentadienyl)zirconium dichloride, methylenebis(methylcyclopentadienyl)hafnium dichloride, methylenebis(butylcyclopentadienyl)titanium dichloride, methylenebis(butylcyclopentadienyl)zirconium dichloride, methylenebis(butylcyclopentadienyl)hafnium dichloride, methylenebis(tetramethylcyclopentadienyl)titanium dichloride, methylenebis(tetramethylcyclopentadienyl)zirconium dichloride, methylenebis(tetramethylcyclopentadienyl)hafnium dichloride, ethylenebis(indenyl)titanium dichloride, ethylenebis(indenyl)zirconium dichloride, ethylenebis(indenyl)hafnium dichloride, ethylenebis(tetrahydroindenyl)titanium dichloride, ethylenebis(tetrahydroindenyl)zirconium dichloride, ethylenebis(tetrahydroindenyl)hafnium dichloride, ethylenebis(2-methyl-1-indenyl)titanium dichloride, ethylenebis(2-methyl-1-indenyl)zirconium dichloride, ethylenebis(2-methyl-1-indenyl)hafnium dichloride, isopropylidene(cyclopentadienyl-9-fluorenyl)titanium dichloride, isopropylidene(cyclopentadienyl-9-fluorenyl)zirconium dichloride, isopropylidene(cyclopentadienyl-9-fluorenyl)hafnium dichloride, isopropylidene(cyclopentadienyl-2,7-dimethyl-9-fluorenyl)titanium dichloride, isopropylidene(cyclopentadienyl-2,7-dimethyl-9-fluorenyl)zirconium dichloride, isopropylidene(cyclopentadienyl-2,7-dimethyl-9-fluorenyl)hafnium dichloride, isopropylidene(cyclopentadienyl-2,7-di-t-butyl-9-fluorenyl)titanium dichloride, isopropylidene(cyclopentadienyl-2,7-di-t-butyl-9-fluorenyl)zirconium dichloride, isopropylidene(cyclopentadienyl-2,7-di-t-butyl-9-fluorenyl)hafnium dichloride, diphenylmethylene(cyclopentadienyl-9-fluorenyl)titanium dichloride, diphenylmethylene(cyclopentadienyl-9-fluorenyl)zirconium dichloride, diphenylmethylene(cyclopentadienyl-9-fluorenyl)hafnium dichloride, diphenylmethylene(cyclopentadienyl-2,7-dimethyl-9-fluorenyl)titanium dichloride, diphenylmethylene(cyclopentadienyl-2,7-dimethyl-9-fluorenyl)zirconium dichloride, diphenylmethylene(cyclopentadienyl-2,7-dimethyl-9-fluorenyl)hafnium dichloride, diphenylmethylene(cyclopentadienyl-2,7-di-t-butyl-9-fluorenyl)titanium dichloride, diphenylmethylene(cyclopentadienyl-2,7-di-t-butyl-9-fluorenyl)zirconium dichloride, diphenylmethylene(cyclopentadienyl-2,7-di-t-butyl-9-fluorenyl)hafnium dichloride, dimethylsilanediylbis(cyclopentadienyl)titanium dichloride, dimethylsilanediylbis(cyclopentadienyl)zirconium dichloride, dimethylsilanediylbis(cyclopentadienyl)hafnium dichloride, dimethylsilanediylbis(methylcyclopentadienyl)titanium dichloride, dimethylsilanediylbis(methylcyclopentadienyl)zirconium dichloride, dimethylsilanediylbis(methylcyclopentadienyl)hafnium dichloride, dimethylsilanediylbis(butylcyclopentadienyl)titanium dichloride, dimethylsilanediylbis(butylcyclopentadienyl)zirconium dichloride, dimethylsilanediylbis(butylcyclopentadienyl)hafnium dichloride, dimethylsilanediylbis(2,4,5-trimethylcyclopentadienyl)titanium dichloride, dimethylsilanediylbis(2,4-dimethylcyclopentadienyl)titanium dichloride, dimethylsilanediylbis(3-methylcyclopentadienyl)titanium dichloride, dimethylsilanediylbis(4-t-butyl-2-methylcyclopentadienyl)titanium dichloride, dimethylsilanediylbis(tetramethylcyclopentadienyl)titanium dichloride, dimethylsilanediylbis(indenyl)titanium dichloride, dimethylsilanediylbis(2-methylindenyl)titanium dichloride, dimethylsilanediylbis(tetrahydroindenyl)titanium dichloride, dimethylsilanediyl(cyclopentadienyl-9-fluorenyl)titanium dichloride, dimethylsilanediyl(cyclopentadienyl-2,7-dimethyl-9-fluorenyl)titanium dichloride, dimethylsilanediyl(cyclopentadienyl-2,7-di-t-butyl-9-fluorenyl)titanium dichloride, dimethylsilanediylbis(2,4,5-trimethylcyclopentadienyl)zirconium dichloride, dimethylsilanediylbis(2,4-dimethylcyclopentadienyl)zirconium dichloride, dimethylsilanediylbis(3-methylcyclopentadienyl)zirconium dichloride, dimethylsilanediylbis(4-t-butyl-2-methylcyclopentadienyl)zirconium dichloride, dimethylsilanediylbis(tetramethylcyclopentadienyl)zirconium dichloride, dimethylsilanediylbis(indenyl)zirconium dichloride, dimethylsilanediylbis(2-methylindenyl)zirconium dichloride, dimethylsilanediylbis(tetrahydroindenyl)zirconium dichloride, dimethylsilanediyl(cyclopentadienyl-9-fluorenyl)zirconium dichloride, dimethylsilanediyl(cyclopentadienyl-2,7-dimethyl-9-fluorenyl)zirconium dichloride, dimethylsilanediyl(cyclopentadienyl-2,7-di-t-butyl-9-fluorenyl)zirconium dichloride, dimethylsilanediylbis(2,4,5-trimethylcyclopentadienyl)hafnium dichloride, dimethylsilanediylbis(2,4-dimethylcyclopentadienyl)hafnium dichloride, dimethylsilanediylbis(3-methylcyclopentadienyl)hafnium dichloride, dimethylsilanediylbis(4-t-butyl-2-methylcyclopentadienyl)hafnium dichloride, dimethylsilanediylbis(tetramethylcyclopentadienyl)hafnium dichloride, dimethylsilanediylbis(indenyl)hafnium dichloride, dimethylsilanediylbis(2-methylindenyl)hafnium dichloride, dimethylsilanediylbis(tetrahydroindenyl)hafnium dichloride, dimethylsilanediyl(cyclopentadienyl-9-fluorenyl)hafnium dichloride, dimethylsilanediyl(cyclopentadienyl-2,7-dimethyl-9-fluorenyl)hafnium dichloride, dimethylsilanediyl(cyclopentadienyl-2,7-di-t-butyl-9-fluorenyl)hafnium dichloride, diethylsilanediylbis(2,4,5-trimethylcyclopentadienyl)titanium dichloride, diethylsilanediylbis(2,4-dimethylcyclopentadienyl)titanium dichloride, diethylsilanediylbis(3-methylcyclopentadienyl)titanium dichloride, diethylsilanediylbis(4-t-butyl-2-methylcyclopentadienyl)titanium dichloride, diethylsilanediylbis(tetramethylcyclopentadienyl)titanium dichloride, diethylsilanediylbis(indenyl)titanium dichloride, diethylsilanediylbis(2-methylindenyl)titanium dichloride, diethylsilanediylbis(tetrahydroindenyl)titanium dichloride, diethylsilanediyl(cyclopentadienyl-9-fluorenyl)titanium dichloride, diethylsilanediyl(cyclopentadienyl-2,7-dimethyl-9-fluorenyl)titanium dichloride, diethylsilanediyl(cyclopentadienyl-2,7-di-t-butyl-9-fluorenyl)titanium dichloride, diethylsilanediylbis(2,4,5-trimethylcyclopentadienyl)zirconium dichloride, diethylsilanediylbis(2,4-dimethylcyclopentadienyl)zirconium dichloride, diethylsilanediylbis(3-methylcyclopentadienyl)zirconium dichloride, diethylsilanediylbis(4-t-butyl-2-methylcyclopentadienyl)zirconium dichloride, diethylsilanediylbis(tetramethylcyclopentadienyl)zirconium dichloride, diethylsilanediylbis(indenyl)zirconium dichloride, diethylsilanediylbis(2-methylindenyl)zirconium dichloride, diethylsilanediylbis(tetrahydroindenyl)zirconium dichloride, diethylsilanediyl(cyclopentadienyl-9-fluorenyl)zirconium dichloride, diethylsilanediyl(cyclopentadienyl-2,7-dimethyl-9-fluorenyl)zirconium dichloride, diethylsilanediyl(cyclopentadienyl- 2,7-di-t-butyl-9-fluorenyl)zirconium dichloride, diethylsilanediylbis(2,4,5-trimethylcyclopentadienyl)hafnium dichloride, diethylsilanediylbis(3-methylcyclopentadienyl)hafnium dichloride, diethylsilanediylbis(4-t-butyl-2-methylcyclopentadienyl)hafnium dichloride, diethylsilanediylbis(tetramethylcyclopentadienyl)hafnium dichloride, diethylsilanediylbis(indenyl)hafnium dichloride, diethylsilanediylbis(2-methylindenyl)hafnium dichloride, diethylsilanediylbis(tetrahydroindenyl)hafnium dichloride, diethylsilanediyl(cyclopentadienyl-9-fluorenyl)hafnium dichloride, diethylsilanediyl(cyclopentadienyl-2,7-dimethyl-9-fluorenyl)hafnium dichloride, diethylsilanediyl (cyclopentadienyl-2,7-di-t-butyl-9-fluorenyl)hafnium dichloride, diphenylsilanediylbis(2,4,5-trimethylcyclopentadienyl)titanium dichloride, diphenylsilanediylbis(2,4-dimethylcyclopentadienyl) titanium dichloride, diphenylsilanediylbis(3-methylcyclopentadienyl)titanium dichloride, diphenylsilanediylbis(4-t-butyl-2-methylcyclopentadienyl)titanium dichloride, diphenylsilanediylbis(tetramethylcyclopentadienyl)titanium dichloride, diphenylsilanediylbis(indenyl)titanium dichloride, diphenylsilanediylbis(2-methylindenyl)titanium dichloride, diphenylsilanediylbis(tetrahydroindenyl)titanium dichloride, diphenylsilanediyl(cyclopentadienyl-9-fluorenyl)titanium dichloride, diphenylsilanediyl(cyclopentadienyl-2,7-dimethyl-9-fluorenyl)titanium dichloride, diphenylsilanediyl(cyclopentadienyl- 2,7-di-t-butyl-9-fluorenyl)titanium dichloride, diphenylsilanediylbis(2,4,5-trimethylcyclopentadienyl)zirconium dichloride, diphenylsilanediylbis(2,4-dimethylcyclopentadienyl)zirconium dichloride, diphenylsilanediylbis(3-methylcyclopentadienyl)zirconium dichloride, diphenylsilanediylbis(4-t-butyl-2-methylcyclopentadienyl)zirconium dichloride, diphenylsilanediylbis(tetramethylcyclopentadienyl)zirconium dichloride, diphenylsilanediylbis(indenyl)zirconium dichloride, diphenylsilanediylbis(2-methylindenyl)zirconium dichloride, diphenylsilanediylbis(tetrahydroindenyl)zirconium dichloride, diphenylsilanediyl(cyclopentadienyl-9-fluorenyl)zirconium dichloride, diphenylsilanediyl(cyclopentadienyl-2,7-dimethyl-9-fluorenyl)zirconium dichloride, diphenylsilanediyl(cyclopentadienyl-2,7-di-t-butyl-9-fluorenyl)zirconium dichloride, diphenylsilanediylbis(2,4,5-trimethylcyclopentadienyl)hafnium dichloride, diphenylsilanediylbis(3-methylcyclopentadienyl)hafnium dichloride, diphenylsilanediylbis(4-t-butyl-2-methylcyclopentadienyl)hafnium dichloride, diphenylsilanediylbis(tetramethylcyclopentadienyl)hafnium dichloride, diphenylsilanediylbis(indenyl)hafnium dichloride, diphenylsilanediylbis(2-methylindenyl)hafnium dichloride, dipyhenylsilanediylbis(tetrahydroindenyl)hafnium dichloride, diphenylsilanediyl(cyclopentadienyl-9-fluorenyl)hafnium dichloride, diphenylsilanediyl (cyclopentadienyl-2,7-dimethyl-9-fluorenyl)hafnium dichloride, and diphenylsilanediyl(cyclopentadienyl-2,7-di-t-butyl-9-fluorenyl)hafnium dichloride; and dimethyl compounds, diethyl compounds, dihydro compounds, diphenyl compounds, and dibenzyl compounds corresponding to these dichloride compounds.

Examples of the compounds represented by formulae (13) to (16) include dichlorides, such as pentamethylcyclopentadienyl-di-t-butylphoshinotitanium dichloride, pentamethylcyclopentadienyl-di-t-butylamidotitanium dichloride, pentamethylcyclopentadienyl-n-butoxidotitanium dichloride, pentamethylcyclopentadienyl-di-t-butylphosphinozirconium dichloride, pentamethylcyclopentadienyl-di-t-butylamidozirconium dichloride, pentamethylcyclopentadienyl-n-butoxidozirconium dichloride, pentamethylcyclopentadienyl-di-t-butylphosphinohafnium dichloride, pentamethylcyclopentadienyl-di-t-butylamidohafnium dichloride, pentamethylcyclopentadienyl-n-butoxidohafnium dichloride, (t-butylamido)dimethyl(tetramethyl-$\eta$5-cyclopentadienyl)silanetitanium dichloride, (t-butylamido)(t-butyl-$\eta$5-cyclopentadienyl)dimethylsilanetitanium dichloride, (t-butylamido)dimethyl(trimethylsilyl-$\eta$5-cyclopentadienyl)silanetitanium dichloride, dimethyl (phenylamido)(tetramethyl-$\eta$5-cyclopentadienyl) silanetitanium dichloride, (t-butylamido)methylphenyl (tetramethyl-$\eta$5-cyclopentadienyl)silanetitanium dichloride, (p-n-butylphenylamido)dimethyl(tetramethyl-$\eta$5-cyclopentadienyl)silanetitanium dichloride, dimethyl(p-methoxyphenylamido)(tetramethyl-$\eta$5-cyclopentadienyl)silanetitanium dichloride, (t-butyl-$\eta$5-cyclopentadienyl)(2,5-di-t-butylphenylamido)dimethylsilanetitanium dichloride, (t-butylamido)dimethyl($\eta$5-indenyl)silanetitanium dichloride, (cyclohexylamido)dimethyl(tetramethyl-$\eta$5-cyclopentadienyl)silanetitanium dichloride, (cyclohexylamido)dimethyl(fluorenyl)silanetitanium dichloride, (cyclododecylamido)dimethyl(tetramethyl-$\eta$5-cyclopentadienyl)silanetitanium dichloride, (t-butylamido)dimethyl(tetramethyl-$\eta$5-cyclopentadienyl)silanezirconium dichloride, (t-butylamido)(t-butyl-$\eta$5-cyclopentadienyl)dimethylsilanezirconium dichloride, (t-butylamido)dimethyl(trimethylsilyl-$\eta$5-cyclopentadienyl)silanezirconium dichloride, dimethyl(phenylamido)(tetramethyl-$\eta$5-cyclopentadienyl)silanezirconium dichloride, (t-butylamido)methylphenyl(tetramethyl-$\eta$5-cyclopentadienyl)silanezirconium dichloride, (p-n-butylphenylamido)dimethyl(tetramethyl-$\eta$5-cyclopentadienyl)silanezirconium dichloride, dimethyl(p-methoxyphenylamido)(tetramethyl-$\eta$5-cyclopentadienyl)silanezirconium dichloride, (t-butyl-$\eta$5-cyclopentadienyl)(2,5-di-t-butylphenylamido)dimethylsilanezirconium dichloride, (t-butylamido)dimethyl($\eta$5-indenyl)silanezirconium dichloride, (cyclohexylamido)dimethyl(tetramethyl-$\eta$5-cyclopentadienyl)silanezirconium dichloride, (cyclohexylamido)dimethyl(fluorenyl)silanezirconium dichloride, (cyclododecylamido)dimethyl(tetramethyl-$\eta$5-cyclopentadienyl)silanezirconium dichloride, (t-butylamido)dimethyl(tetramethyl-$\eta$5-cyclopentadienyl)silanehafnium dichloride, (t-butylamido)(t-butyl-$\eta$5-cyclopentadienyl)dimethylsilanehafnium dichloride, (t-butylamido)dimethyl(trimethylsilyl-$\eta$5-cyclopentadienyl)silanehafnium dichloride, dimethyl (phenylamido)(tetramethyl-$\eta$5-cyclopentadienyl) silanehafnium dichloride, (t-butylamido)methylphenyl (tetramethyl-$\eta$5-cyclopentadienyl)silanehafnium dichloride, (p-n-butylphenylamido)dimethyl(tetramethyl-$\eta$5-cyclopentadienyl)silanehafnium dichloride, dimethyl(p-methoxyphenylamido)(tetramethyl-$\eta$5-cyclopentadienyl) silanehafnium dichloride, (t-butyl-$\eta$5-cyclopentadienyl)(2,5-di-t-butylphenylamido)dimethylsilanehafnium dichloride, (t-butylamido)dimethyl($\eta$5-indenyl)silanehafnium dichloride, (cyclohexylamido)dimethyl(tetramethyl-$\eta$5-cyclopentadienyl)silanehafnium dichloride, (cyclohexylamido)dimethyl(fluorenyl)silanehafnium dichloride, (cyclododecylamido)dimethyl(tetramethyl-$\eta$5-cyclopentadienyl)silanehafnium dichloride; and dimethyl compounds, diethyl compounds, dihydro compounds, diphenyl compounds, and dibenzyl compounds corresponding to these dichloride compounds.

The organometallic compound to be used in the invention as compound (b) includes those represented by formula (27):

$$M^5R^{16}{}_s \tag{27}$$

wherein $M^5$ represents an element of the Group 1, 2 or 13 of the Periodic Table, a tin atom or a zinc atom; a plurality of $R^{16}$'s independently represent a hydrogen atom, an alkyl or alkoxy group having 1 to 24 carbon atoms or an aryl, aryloxy, arylalkyl, arylalkoxy, alkylaryl or alkylaryloxy group having 6 to 24 carbon atoms (e.g., a hydrogen atom, the alkyl, alkoxy, aryl, aryloxy, arylalkyl, arylalkoxy, alkylaryl and alkylaryloxy groups exemplified above for $R^9$), provided that at least one $R^{16}$ is a hydrogen atom, an alkyl group having 1 to 24 carbon atoms or an aryl, arylalkyl or alkylaryl group having 6 to 24 carbon atoms; and s is an oxidation number of $M^5$.

Examples of the compound represented by formula (27) are trimethylaluminum, triethylaluminum, triisopropylaluminum, tri-n-propylaluminum, triisobutylaluminum, tri-n-butylaluminum, triamylaluminum, dimethylaluminum ethoxide, diethylaluminum ethoxide, diisopropylaluminum ethoxide, di-n-propylaluminum ethoxide, diisobutylaluminum ethoxide, di-n-butylaluminum ethoxide, dimethylaluminum hydride, diethylaluminum hydride, diisopropylaluminum hydride, di-n-propylaluminum hydride, diisobutylaluminum hydride, and di-n-butylaluminum hydride.

In the following is described the solid catalyst component used in the invention as component (c), which is composed of a carrier having supported thereon the ionized ionic compound capable of becoming a stable anion upon reaction with a transition metal compound, wherein the ionized ionic compound comprises a cationic component and an anionic component and the cationic component is fixed on the surface of the carrier. The ionized ionic compound is represented by formula (28):

$$[C^+][A^-] \tag{28}$$

wherein $[A^-]$ is an anionic component of the ionized ionic compound, which forms a stable anion on reaction with a transition metal compound; and $[C^+]$ is a cationic component of the ionized ionic compound.

The anionic component includes those containing a boron, aluminum, phosphorus or antimony atom such as an organoboron compound anion, an organoaluminum compound anion, an organophosphorus compound anion, and an organoantimony compound anion. Specific examples of the anionic component are tetrakis(pentafluorophenyl)boron, tetrakisphenylboron, tetrakis(p-tolyl)boron, tetrakis(m-tolyl)boron, tetrakis(2,4-dimethylphenyl)boron, tetrakis(3,5-dimethylphenyl)boron, tetrafluoroboron, tetrakis(3,4,5-trifluorophenylphenyl)boron, tetrakis(3,5-di(t-butyl)phenyl)boron, tetrakis(3,5-di(trifluoromethyl)phenyl)boron, tetrakis(pentafluorophenyl)aluminum, tetrakisphenylaluminum, tetrakis(p-tolyl)aluminum, tetrakis(m-tolyl)aluminum, tetrakis(2,4-dimethylphenyl)aluminum, tetrakis(3,5-dimethylphenyl)aluminum, tetrafluoroaluminum, tetrakis(3,4,5-trifluorophenylphenyl)aluminum, tetrakis(3,5-di(t-butyl)phenyl)aluminum, tetrakis(3,5-di(trifluoromethyl)phenyl)aluminum, tetrakis(pentafluorophenyl)phosphorus, and tetrakis(pentafluorophenyl)antimony.

Solid catalyst component (c) is characterized by comprising the carrier and the ionized ionic compound, wherein the ionized ionic compound comprises a cationic component and an anionic component and the cationic component is fixed on the surface of the carrier. In this instance, the carrier may have a cationic surface and the cationic surface may be the cationic component constituting the ionized ionic compound. The cationic component preferably comprises a Lewis basic functional group containing an element of the Group 15 or 16 of the Periodic Table, such as an ammonium cation, an oxonium cation, a sulfonium cation, a phosphonium cation. The cationic component may also preferably comprises a functional group other than the Lewis basic functional group, such as a carbonium cation, tropinium cation, and a metal cation. Specific but non-limiting examples of the cationic groups include tripropylammonium, tributylammonium, N,N-dimethylanilinium, N,N-2,4,5-pentamethylanilinium, pyridinium, diethyloxonium, triphenylsulfonium, trimethylsulfonium, triphenylphosphonium, tri(o-tolyl)phosphonium, triphenylcarbonium, cycloheptatrienium, and ferrocenium. In case of a carrier having a cationic surface, the cationic component may be present on the surface of the carrier as the cationic surface. In this case, the cationic component is present on the surface of the carrier in the manner that a part or the whole part of the cationic component is fixed on the carrier through a chemically bond. The cationic group or the group containing the cationic group may be a part of the components constituting the carrier or be introduced and fixed on the surface of the carrier by chemical modification.

The carrier compound which can be used in the preparation of solid catalyst component (c) may be either inorganic compounds or organic polymeric compounds. The inorganic compounds include inorganic oxides, such as alumina, silica, silica-alumina, and silica-magnesia; clay minerals; and inorganic halides. The inorganic oxides usually contain salts, such as alkali metal or alkaline earth metal carbonates or sulfates (e.g., $K_2CO_3$ and $BaSO_4$) as impurity. The inorganic oxides may be used as containing these impurities but are preferably used after removal of the impurities. While the properties of these inorganic compound carriers differ depending on the kind and the process of preparation, those inorganic compound carriers having a specific surface area of 10 to 1,000 $m^2/g$, particularly 50 to 800 $m^2/g$, and a pore volume of 0.1 to 3 cc/g are preferred in the invention for their capacity of fixing a large quantity of the ionized ionic compound. The particle size of the inorganic compound carrier influences the particle size of the polymer produced. In order to prevent the polymer particles from becoming fine powder or extraordinarily grown particles, the inorganic compound carrier preferably has an average particle size of 1 to 300 $\mu$m. An average particle size of 10 to 200 $\mu$m is still preferred for further improving the influence on the polymer particles produced. If desired, the inorganic oxides, clay minerals or inorganic halides are previously heat treated at 100° to 1,200° C. under reduced pressure or in a gas flow to improve volatile impurities such as water.

The organic polymeric compound carrier includes finely particulate polymeric compounds obtained by homopolymerizing or copolymerizing a monomer having a functional group capable of constituting a cationic group, such as 4-vinylpyridine, 2-vinylpyridine, methyl vinyl ether, ethyl vinyl ether, and phenyl vinyl sulfide; and other polymers, such as polyolefins (e.g., ethylene polymers and ethylene-α-olefin copolymers), polyesters, polyvinyl chloride, polystyrene, polymethyl acrylate, polymethyl methacrylate, and various natural polymers, having introduced to the surface thereof a functional group through chemical modification. While the properties of these organic high polymeric compound carriers differ depending on the kind and the process of preparation, the organic polymeric compound carrier preferably has a particle size of 5 to 2,000 $\mu$m, more preferably 10 to 1,000 μm. The molecular weight of the high polymeric compound is arbitrary as long as the compound can exist as solid substance during the catalyst preparation and olefin polymerization.

Solid catalyst component (c) with an ionized ionic compound fixed thereon can be prepared by, for example, (1) a method of reacting a solid component having a cationic surface or a solid component whose surface has been rendered cationic by chemical modification with an anionic group of the above-mentioned ionic compound or (2) a method comprising preparing an ionic compound composed of the above-mentioned cationic group and anionic component and bonding the ionic compound to the surface of a carrier via the reactive group other than the cationic portion of the cationic group. In method (1), the method for chemically modifying the surface of an inorganic compound carrier or an organic polymeric compound carrier to introduce a functional group capable of constituting a cationic group is not particularly restricted. For example, the methods described in *R & D Report,* No. 17, "Kobunshi Shokubai no Kogyoka (Industrialization of Polymer Catalyst)", CMC K.K. (1981), *Jikken Kagaku Koza* 28 (Course of Experimental Chemistry), "Kobunshi Gosei (Polymer Synthesis)", Maruzen (1992), and *Kobunshi wo Motiiru Goseikagaku* (Synthetic Chemistry Using Polymer), Kodansha (1976) may be used.

More specifically, chemical modification to an inorganic oxide having a surface hydroxy group, such as silica, may be carried out, for example, in: a method in which a silane compound (e.g., a silyl ether, a silane halide) having a functional group capable of constituting a cationic group is fixed by coupling with the surface hydroxy group; and a method in which the surface hydroxy group is chlorinated with a chlorination agent, such as thionyl chloride or silicon tetrachloride, and thereafter reacted with an organic metal having a functional group to fix it directly. Furthermore, the solid catalyst component with an ionized ionic compound fixed thereon may also be prepared by subjecting a silyl ether or silane halide having a functional group to sol-gel processing in the presence of water, an appropriate catalyst and, if necessary, an inorganic or organic carrier. In case of an organic polymer carrier such as polystyrene, a functional group capable of forming a cationic group, such as an amino group, may be introduced to a phenyl group at the side chain in a conventional aromatic substitution reaction. Alternatively, the organic polymer carrier may be halogenated or chloromethylated and then a functional group capable of forming a cationic group, such as an amino group, a sulfide, an ether, a ferrocene, may be introduced thereto.

In preparing the catalyst system of the invention, the manner of reacting components (a), (b) and (c) is not particularly limited as long as the reaction conditions allow the components (a) and (c) to react. For example, the reaction may be carried out by: adding component (a) to component (c); adding component (c) to component (a); adding component (a) to a mixture of component (c) and component (b); adding component (c) to a mixture of component (a) and component (b); adding a mixture of component (a) and component (b) to a mixture of component (c) and component (b); adding a mixture of component (c) and component (b) to a mixture of component (a) and component (b); or mixing components (c), (a) and (b) simultaneously.

The mixing is conducted in a solvent or in a grinding mixer, such as a ball mill. The reaction conditions are not particularly limited as long as the time and temperature are sufficient for allowing components (c), (a) and (b) to react.

Examples of the solvent suitable in the reaction include organic solvents, such as toluene and hexane; and halogen-containing solvents, such as methylene chloride. The temperature for reacting component (c) with component (a) or for reacting component (c) with components (a) and (b) is not particularly limited as long as the transition metal compound as component (a) does not decompose. A preferred temperature range is from $-100°$ to $280°$ C., and a more preferred temperature range is from $-80°$ to $130°$ C., in which the reaction is controllable and can be allowed to proceed sufficiently. By-produced compounds may be removed by washing with a solvent capable of dissolving them. If the by-produced compounds are volatile, they can be removed under reduced pressure.

While not limiting, a molar ratio of component (a) to component (c) is preferably such that the molar ratio of component (a) to the anionic component of component (c) ranges from 0.01 to 1,000. With the molar ratio falling within that range, the catalyst system exhibiting high activity is obtained. A particularly preferred molar ratio of component (a) to the anionic component in component (c) is 0.2 to 500, at which an increased productivity of olefin polymers can be assured, and the ash content in the resulting olefin polymers can be reduced.

While not limiting, component (b) is preferably used at a molar ratio of 0.1 to 1,000 based on component (a). With the component (b) to component (a) molar ratio falling within that range, it is possible to prevent the catalyst from being deactivated with impurities. The molar ratio is still preferably 1 to 800 and particularly preferably 50 to 600, at which olefin polymers can be synthesized without producing an excess ash content.

An olefin may be preliminarily polymerized in the presence of the above-described components. Preliminary olefin polymerization can be carried out by bringing transition metal compound (a), solid catalyst component (c) and, if desired, organometallic compound (b) into contact with each other in the presence or absence of an inert hydrocarbon solvent and introducing an olefin thereto. The contact treatment of the catalyst components is generally conducted at $-50°$ to $100°$ C., preferably $-20°$ to $60°$ C., and still preferably $0°$ to $50°$ C., under normal pressure or under pressure. It is preferable for the components to be brought into thorough contact in a fluidized state in a gas phase or in a stirred state in a liquid phase. The olefin to be preliminarily polymerized is selected from the olefins to be used in the polymerization. Ethylene is preferred. In the preliminary polymerization, the prepolymer is preferably produced in an amount of 0.1 to 100 g per gram of the catalyst for olefin polymerization.

Olefin polymerization using the above-mentioned catalyst system is preferably carried out by polymerizing or copolymerizing an a-olefin and/or a cyclic olefin in the presence of the above-described catalyst in a solution, suspension or gas phase at a temperature of $-60°$ to $280°$ C. under a pressure of 0.5 to 2,000 bar.

The olefins which can be polymerized according to the process of the invention include a-olefins, such as ethylene, propylene, 1-butene, 4-methyl-1-pentene, and 1-hexane; conjugated or non-conjugated dienes, such as butadiene and 1,4-hexadiene; cyclic olefins, such as cyclopentene and norbornene; styrene; vinylcyclohexane; and mixtures of two or more thereof.

The olefin polymerization can be performed either in a liquid phase or a gas phase. Any conventional organic solvent can be used in liquid phase polymerization. Suitable organic solvents include benzene, toluene, xylene, pentane, hexane, high-boiling hydrocarbons having 7 or more carbon atoms, methylene chloride, and mixtures thereof. The olefin monomer to be polymerized may serve as solvent. While not limiting, the polymerization temperature is preferably −60° to 280° C.

The present invention will now be illustrated in greater detail with reference to Examples, but it should be understood that the invention is not construed as being limited thereto.

Silane compounds synthesized were identified by $^1$H-NMR analysis in deuterio chloroform (internal standard: chloroform) at 400 MHz using JNMGX 400 manufactured by JEOL Ltd.

The melt index (MI) and a ratio (N value) of MI at low load (2.16 kg) to MI at high load (21.6 kg) were obtained by measurement according to ASTM D1238.

All the operations for polymerization, reaction and purification with a solvent were carried out in an inert gas atmosphere. All the solvents used had previously been purified, dried and/or deoxidation in conventional manners. The compounds used in reactions had been synthesized and identified in conventional manners.

Unless otherwise indicated, all the percents are by weight.

SYNTHESIS EXAMPLE 1
Synthesis of (p-N,N-Dimethylaminophenyl)trimethoxysilane

In a 200 ml two-necked flask equipped with a dropping funnel were put 1.01 g (41.5 mmol) of magnesium, 50 ml of tetrahydrofuran (THF), and a small amount of iodine in a nitrogen stream, and a solution of 8.32 g (41.6 mmol) of p-bromo-N,N-dimethylaniline in 50 ml of THF was added thereto dropwise at room temperature over a 40-minute period while stirring. After the addition, the mixture was stirred at room temperature for 75 minutes, and a solution of 6.40 g (42.0 mmol) of tetramethoxysilane in 60 ml of THF was further added thereto, followed by stirring at room temperature overnight. The solvent was removed under reduced pressure, and the residue was suspended in 100 ml of toluene and filtered. The filtrate was concentrated under reduced pressure to obtain the title compound in a yield of 75%.

The $^1$H-NMR spectrum of the resulting silane compound showed peaks at δ=7.52 (d, 2H, aromatic H), 6.74 (d, 2H, aromatic H), 3.61 (s, 9H, Si(O-CH$_3$)$_3$), and 2.99 (s, 6H, N(CH$_3$)$_2$). As a result, the product was identified to be (p-N,N-dimethylaminophenyl)trimethoxysilane.

SYNTHESIS EXAMPLE 2
Synthesis of (p-N,N-Dimethylaminophenyl)methyldimethoxysilane The title compound was obtained in a yield of 65% in the same manner as in Synthesis Example 1 except for using methyltrimethoxysilane in place of tetramethoxysilane.

The resulting silane compound was identified to be (p-N,N-dimethylaminophenyl)methoxydimethoxysilane from its $^1$H-NMR spectrum showing peaks at δ=7.49 (d, 2H, aromatic H), 6.74 (d, 2H, aromatic H), 3.56 (s, 6H, Si(OCH$_3$)$_2$), 2.99 (s, 6H, N(CH$_3$)$_2$), and 0.32 (s, 3H, SiCH$_3$).

EXAMPLE 1
Synthesis of Solid Catalyst Component A

In a 200 ml Schlenk flask were put 5.30 g of silica (Davison 948; calcined at 200° C. under reduced pressure for 5 hrs), 100 ml of toluene, and 2.0 g (9.1 mmol) of (p-N,N-dimethylaminophenyl)trimethoxysilane synthesized in Synthesis Example 1, and the mixture was stirred at 110° C. for 16 hours. After completion of the reaction, the reaction mixture was washed with toluene 4 times. The resulting silane-modified silica had a carbon content of 4.3% by weight.

In 50 ml of ether was suspended 1.87 g of the silane-modified silica, and hydrogen chloride was blown into the suspension at room temperature for 30 minutes. The silane-modified silica was washed with hexane, dried under reduced pressure, and again suspended in 60 ml of methylene chloride. To the suspension was added a solution of 0.6 g (0.87 mmol) of lithium tetrakis(pentafluorophenyl)borate in 40 ml of methylene chloride, followed by stirring at room temperature for 3 hours. The reaction mixture was washed with methylene chloride 3 times and dried in vacuo to obtain a solid catalyst component (designated solid catalyst component A). Solid catalyst component A had a carbon content of 11.1% by weight.

Slurry Polymerization of Ethylene in Hexane Using Solid Catalyst Component A

In a 2 l autoclave having been dried and purged with dry nitrogen were put 500 ml of hexane, 0.25 mmol of triisobutylaluminum, and 0.0005 mmol of ethylenebisindenylzirconium dichloride, and the mixture was stirred for 5 minutes. To the autoclave was added 9.2 mg of solid catalyst component A, and ethylene was then introduced therein to conduct polymerization at 80° C. for 30 minutes while feeding ethylene to maintain the inner pressure at 4 kg/cm$^2$. The autoclave was cooled and the resulting polyethylene was collected by filtration and dried under reduced pressure. The yield was 28.1 g, and the bulk density was 0.23 g/cm$^3$. Adhesion of the polymer to the inner wall of the autoclave was not observed.

EXAMPLE 2
Slurry Polymerization of Ethylene in Hexane Using Solid Catalyst Component A Slurry polymerization of ethylene was carried out in the same manner as in Example 1 except for using 36.9 mg of solid catalyst component A. The resulting polyethylene weighed 54.2 g and had an MI of 0.003 g/10 min., an N value of 488, and a bulk density of 0.15 g/cm$^3$. Adhesion of the polymer to the inner wall of the autoclave was not observed.

EXAMPLE 3
Synthesis of Solid Catalyst Component B

Solid catalyst component B was prepared in the same manner as for solid catalyst component A in Example 1, except for replacing the (p-N,N-dimethylaminophenyl)trimethoxysilane used for silica modification with (p-N,N-dimethylaminophenyl)methyldimethoxysilane synthesized in Synthesis Example 2. The carbon content of the silane-modified silica was 4.0% by weight, and that of solid catalyst component B was 9.6% by weight.

Slurry Polymerization of Ethylene in Hexane Using Solid Catalyst Component B

Slurry polymerization of ethylene was carried out in the same manner as in Example 1 except for using 12.0 mg of solid catalyst component B in place of solid catalyst component A. The resulting polyethylene weighed 30.8 g and had an MI of 0.01 g/10 min. and an N value of 257. Adhesion of the polymer to the inner wall of the autoclave was not observed.

EXAMPLE 4
Slurry Polymerization of Ethylene in Toluene Using Solid Catalyst Component B Slurry polymerization of ethylene was carried out in the same manner as in Example 3 except for using 24.9 mg of solid catalyst component B and replacing hexane as solvent with toluene. The resulting polyethylene weighed 37.4 g and had an MI of 3.82 g/10 min. and an N value of 32. Adhesion of the polymer to the inner wall of the autoclave was not observed.

EXAMPLE 5
Synthesis of Solid Catalyst Component C

In a 300 ml Schlenk flask 1.55 g of poly(vinylpyridine hydrochloride) (produced by Aldrich, 100 to 200 mesh) was suspended in 150 ml of water, and a solution of 1.59 g (2.33 mmol) of lithium tetrakis(pentafluorophenyl)borate in 100 ml of water was added thereto, followed by stirring at room temperature for 3 hours. The particles were washed with water 3 times and then with hexane twice and dried in vacuo to obtain solid catalyst component C.

Slurry Polymerization of Ethylene in Toluene Using Solid Catalyst Component C

Slurry polymerization of ethylene was carried out in the same manner as in Example 4 except for using 9.3 mg of solid catalyst component C in place of solid catalyst component B. The resulting polyethylene weighed 60.6 g and had an MI of 5.47 g/10 min., an N value of 23, and a bulk density of 0.21 g/cm$^3$. Adhesion of the polymer to the inner wall of the autoclave was not observed.

EXAMPLE 6
Preparation of Solid Catalyst Using Solid Catalyst Component A

In a 50 ml Schlenk flask 237.5 mg of solid catalyst component A prepared in Example 1 was suspended in 15 ml of hexane. Separately, 0.0025 mmol of ethylenebisindenylzirconium dichloride and 2.5 mmol of triisobutylaluminum were brought into contact in 5 ml of toluene, and the resulting toluene solution was added to the hexane suspension, followed by allowing the mixture to react for 5 minutes. The reaction mixture was dried under reduced pressure to obtain a solid catalyst.

Gas phase Polymerization Using Solid Catalyst

A 2 l-volume stainless steel-made autoclave of electromagnetic stirring type was thoroughly purged with nitrogen, and 150 g of sodium chloride was put therein as dispersing medium. The inner temperature was raised to 75° C. The above prepared solid catalyst was put in the autoclave, and immediately thereafter ethylene gas was fed and polymerized at 80° C. for 30 minutes while continuously feeding ethylene to keep the inner pressure at 8 kg/cm$^2$G. After the polymerization, the autoclave was cooled, the unreacted gas was driven out, and the mixture of the polymer produced and sodium chloride was withdrawn. The mixture was washed with pure water to remove sodium chloride and dried to give 26.8 g of the polymer having a bulk density of 0.25 g/cm$^3$.

EXAMPLE 7
Preparation of Solid Catalyst Using Solid Catalyst Component A and Gas Phase Polymerization of Ethylene A solid catalyst was prepared and ethylene was polymerized in a gas phase in the same manner as in Example 6, except for using 114.0 mg of solid catalyst component A. As a result, 17.4 g of a polymer having a bulk density of 0.38 g/cm$^3$ was obtained.

EXAMPLE 8
Synthesis of Solid Catalyst Component B

Solid catalyst component D was prepared in the same manner as for solid catalyst component A in Example 1, except for replacing the silica (Davison 948; calcined at 200° C. under reduced pressure for 5 hrs.) with a silica (Fuji Silysia CARiACT G-3, average particle size: 3 μm; calcined at 200° C. under reduced pressure for 5 hrs.).

Slurry Polymerization of Ethylene in Hexane Using Solid Catalyst Component D

Slurry polymerization of ethylene was carried out in the same manner as in Example 1 except for using 42 mg of solid catalyst component D obtained above in place of solid catalyst component A. The resulting polyethylene weighed 40.5 g and had an MI of 0.005 g/10 min. and an N value of 350. Adhesion of the polymer to the inner wall of the autoclave was not observed.

EXAMPLE 9
Synthesis of Solid Catalyst Component E

In a 100 ml Schlenk flask were put 3.9 g of silica (Davison 948; calcined at 200° C. under reduced pressure for 5 hrs.), 50 ml of toluene, and 2.45 g (11.5 mmol) of (p-N,N-dimethylaminophenyl)trimethoxysilane, and the mixture was stirred at 100° C. for 3 hours and then at room temperature for 4 hours. Thereafter, 2 ml of a 0.01N hydrochloric acid was added dropwise to the reaction mixture under ice-cooling, followed by stirring at room temperature overnight. The reaction mixture was then washed with toluene 4 times.

A 2.0 g portion of the resulting silane-modified silica was suspended in 80 ml of ether, and hydrogen chloride was blown into the suspension at room temperature for 30 minutes. The silane-modified silica was washed with hexane, dried under reduced pressure, and again suspended in 50 ml of methylene chloride. To the suspension was added a solution of 1.3 g (1.9 mmol) of lithium tetrakis (pentafluorophenyl)borate in 50 ml of methylene chloride, followed by stirring at room temperature for 3 hours. The reaction mixture was washed with methylene chloride 3 times to obtain solid catalyst component E.

Slurry Polymerization of Ethylene in Hexane Using Solid Catalyst Component E

Slurry polymerization of ethylene was carried out in the same manner as in Example 1 except for using 101 mg of solid catalyst component E obtained above in place of solid catalyst component A. The resulting polyethylene weighed 38.9 g and had an MI of 0.01 g/10 min. and an N value of 240. Adhesion of the polymer to the inner wall of the autoclave was not observed.

EXAMPLE 10
Synthesis of Solid Catalyst Component F

In a 100 ml Schlenk flask were put 3.0 g of silica (Davison 948; calcined at 200° C. under reduced pressure for 5 hrs.), 100 ml of hexane, 2.8 g (23.3 mmol) of dimethyl dimethoxysilane and 1.25 g (5.2 mmol) of (p-N,N-dimethylaminophenyl)trimethoxysilane. Thereafter, 2 ml of a 0.01N hydrochloric acid was added dropwise to the reaction mixture under ice-cooling, followed by stirring at room temperature overnight. The reaction mixture was then washed with toluene 4 times.

A 2.1 g portion of the resulting silane-modified silica was suspended in 100 ml of hexane, and hydrogen chloride was blown into the suspension at room temperature for 30 minutes. The silane-modified silica was washed with hexane, dried under reduced pressure, and again suspended in 50 ml of methylene chloride. To the suspension was added a solution of 1.0 g (1.5 mmol) of lithium tetrakis (pentafluorophenyl)borate in 50 ml of methylene chloride, followed by stirring at room temperature for 3 hours. The reaction mixture was washed with methylene chloride 3 times to obtain solid catalyst component F.

Slurry Polymerization of Ethylene in Hexane Using Solid Catalyst Component F

Slurry polymerization of ethylene was carried out in the same manner as in Example 1 except for using 101 mg of solid catalyst component F obtained above in place of solid catalyst component A and the polymerization time was changed to 10 minutes. The resulting polyethylene weighed 53.6 g and had an MI of 0.02 g/10 min. and an N value of 133. Adhesion of the polymer to the inner wall of the autoclave was not observed.

EXAMPLE 11
Synthesis of Solid Catalyst Component G

In a 100 ml Schlenk flask were put 2.4 g of silica (Davison 948; calcined at 200° C. under reduced pressure for 5 hrs.), 70 ml of toluene, 2.6 g (21.6 mmol) of dimethyl dimethoxysilane and 0.9 g (3.7 mmol) of (p-N,N-dimethylaminophenyl)trimethoxysilane. Thereafter, 1 ml of a 0.02N aqueous solution of sodium hydroxide was added dropwise to the reaction mixture under ice-cooling, followed by stirring at room temperature overnight. The reaction mixture was then washed with toluene 4 times.

A 1.1 g portion of the resulting silane-modified silica was suspended in 100 ml of hexane, and hydrogen chloride was blown into the suspension at room temperature for 30 minutes. The silane-modified silica was washed with hexane, dried under reduced pressure, and again suspended in 50 ml of methylene chloride. To the suspension was added a solution of 0.64 g (0.9 mmol) of lithium tetrakis(pentafluorophenyl)borate in 50 ml of methylene chloride, followed by stirring at room temperature for 3 hours. The reaction mixture was washed with methylene chloride 3 times to obtain solid catalyst component G.

Slurry Polymerization of Ethylene in Hexane Using Solid Catalyst Component G

Slurry polymerization of ethylene was carried out in the same manner as in Example 1 except for using 57 mg of solid catalyst component G obtained above in place of solid catalyst component A and the polymerization time was changed to 10 minutes. The resulting polyethylene weighed 61.8 g and had an MI of 0.04 g/10 min. and an N value of 110. Adhesion of the polymer to the inner wall of the autoclave was not observed.

EXAMPLE 12
Synthesis of Solid Catalyst Component H

In a 100 ml Schlenk flask were put 6.7 g of silica (Davison 948; calcined at 200° C. under reduced pressure for 5 hrs.) and 50 ml of thionyl chloride, and the resulting mixture was stirred under reflux for 12 hours. After removing the supernatant, the reaction mixture was washed with toluene 4 times and dried in vacuo to obtain chlorinated silica.

In a 300 ml Schlenk flask 2.45 g portion of the chlorinated silica obtained above was suspended in 100 ml of ether. To this suspension an ether solution of p-dimethylaminophenylmagnesium bromide (8.5 mmol) prepared separately was added at room temperature, followed by stirring overnight. The reaction mixture was then washed with ether and toluene each twice and dried in vacuo.

A 1.3 g portion of the solid obtained above was suspended in 100 ml of hexane, and hydrogen chloride was blown into the suspension at room temperature for 30 minutes. The solid was washed with hexane, dried under reduced pressure, and again suspended in 50 ml of methylene chloride. To the suspension was added a solution of 0.57 g (0.83 mmol) of lithium tetrakis(pentafluorophenyl)borate in 50 ml of methylene chloride, followed by stirring at room temperature for 3 hours. The reaction mixture was washed with methylene chloride 3 times to obtain solid catalyst component H.

Slurry Polymerization of Ethylene in Hexane Using Solid Catalyst Component H

Slurry polymerization of ethylene was carried out in the same manner as in Example 1 except for using 56 mg of solid catalyst component H obtained above in place of solid catalyst component A and the polymerization time was changed to 20 minutes. The resulting polyethylene weighed 39.6 g and had an MI of 0.01 g/10 min. Adhesion of the polymer to the inner wall of the autoclave was not observed.

EXAMPLE 13
Preparation of Solid Catalyst Using Solid Catalyst Component G and Gas Phase Polymerization Using Solid Catalyst Preparation of a solid catalyst and gas phase polymerization of ethylene was carried out in the same manner as in Example 6 except for using 252 mg of solid catalyst component G in place of solid catalyst component A. As a result, 31.2 g of polyethylene having a bulk density of 0.20 g/cm$^3$ was obtained.

COMPARATIVE EXAMPLE 1
Slurry Polymerization of Ethylene in Toluene

Ethylene was polymerized in the same manner as in Example 4 except for using a toluene solution containing 4 mg of N,N-dimethylanilinium tetrakis(pentafluorophenyl)borate which was synthesized by a known process in place of solid catalyst component B. The resulting polyethylene weighed 66 g and had an MI of 8.5 g/10 min., an N value of 22, and a bulk density of 0.07 g/cm$^3$. Adhesion of a large amount of the polymer to the inner wall of the autoclave was observed.

COMPARATIVE EXAMPLE 2
Slurry Polymerization of Ethylene in Hexane Using Modified Silica In a 2 l autoclave having been dried and purged with dry nitrogen were put 500 ml of hexane, 0.50 mmol of triisobutylaluminum, and 0.0005 mmol of ethylenebisindenylzirconium dichloride, and the mixture was stirred for 5 minutes. To the autoclave was added 0.0005 mmol of N,N-dimethylanilinium tetrakis(pentafluorophenyl)borate, followed by stirring for 5 minutes. Then, 10.2 mg of (p-N,N-dimethylaminophenyl)methyldimethoxysilane-modified silica was added, and ethylene was introduced therein. The contents were kept at 80° C. for 30 minutes while feeding ethylene to maintain the inner pressure at 4 kg/cm$^2$, but a polymer was scarcely obtained.

COMPARATIVE EXAMPLE 3
Preparation of Solid Catalyst

In a 50 ml Schlenk flask 244.5 mg of (p-N,N-dimethylaminophenyl)trimethoxysilane-modified silica was suspended in 7.5 ml of hexane. Separately, 0.0025 mmol of ethylenebisindenylzirconium dichloride, 2.5 mmol of triisobutylaluminum, and 0.0072 mmol of N,N-dimethylanilinium tetrakis(pentafluorophenyl)borate were brought into contact in 7.5 ml of toluene, and the resulting toluene solution was added to the hexane suspension, followed by allowing the mixture to react for 5 minutes. The reaction mixture was dried under reduced pressure to obtain a solid catalyst.

Gas chase Polymerization of Ethylene Using Solid Catalyst

Gas phase polymerization of ethylene was carried out in the same manner as in Example 6 except for using the above prepared solid catalyst, but a polymer was scarcely produced.

As having been fully described and demonstrated, the catalyst system of the invention obtainable by contacting a transition metal compound containing a transition metal of the Group 4 of the Periodic Table, an organometallic compound, and a solid catalyst component comprising a carrier and an ionized ionic compound capable of forming a stable anion on reaction with said transition metal compound, wherein said ionized ionic compound comprises a cationic component and an anionic component and said cationic component is fixed on the surface of the carrier enables production of olefin polymers with excellent physical properties at good productivity without causing contamination of a polymerization vessel.

While the invention has been described in detail and with reference to specific embodiments thereof, it will be apparent to one skilled in the art that various changes and modifications can be made therein without departing from the spirit and scope thereof.

What is claimed is:

1. A catalyst for olefin polymerization obtained by contacting:

(a) a transition metal compound containing a transition metal of Group 4 of the Periodic Table, (b) an organometallic compound, and (c) a solid catalyst component comprising a carrier and an ionized ionic compound capable of forming a stable anion on reaction with said transition metal compound, wherein said ionized ionic compound comprises a cationic component and an anionic component, wherein said cationic component of said ionized ionic compound is fixed on said carrier through a chemical bond, wherein the solid catalyst component (c) is obtained by the reaction between a solid carrier whose surface has been rendered cationic by chemical modification and the anionic group of the ionized ionic compound, and, wherein said transition metal compound as component (a) is a compound represented by formula (1), (2), (13), (14), (15) or (16):

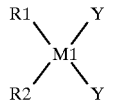
(1)

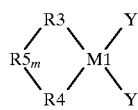
(2)

wherein $M^1$ represents a titanium atom, a zirconium atom or a hafnium atom; a plurality of Y's independently represent a hydrogen atom, a halogen atom, an alkyl group having 1 to 24 carbon atoms or an aryl, arylalkyl or alkylaryl group having 6 to 24 carbon atoms; $R^1$ and $R^2$ independently represent a ligand represented by formula (3), (4), (5) or (6):

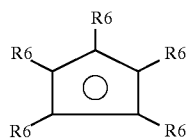
(3)

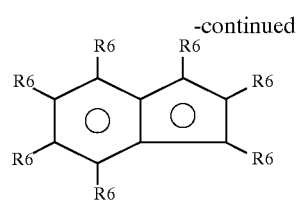
(4)

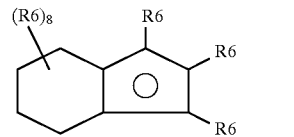
(5)

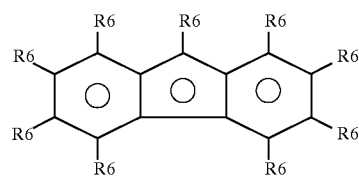
(6)

wherein a plurality of $R^6$'s independently represent a hydrogen atom, an alkyl group having 1 to 24 carbon atoms or an aryl, arylalkyl or alkylaryl group having 6 to 24 carbon atoms; the ligands $R^1$ and $R^2$ form a sandwich structure together with $M^1$; $R^3$ and $R^4$ independently represent a ligand represented by formula (7), (8), (9) or (10):

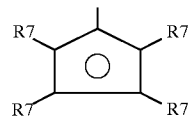
(7)

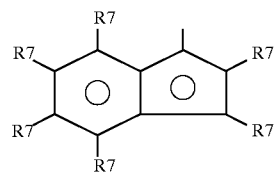
(8)

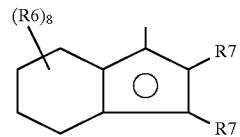
(9)

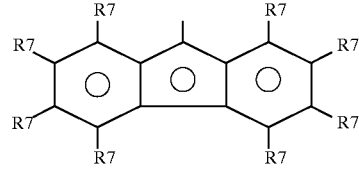
(10)

wherein a plurality of $R^7$'s independently represent a hydrogen atom, an alkyl group having 1 to 24 carbon atoms or an aryl, arylalkyl or alkylaryl group having 6 to 24 carbon atoms;

the ligands as $R^3$ and $R^4$ form a sandwich structure together with $M^1$;

$R^5$ represents a group represented by formula (11) or (12):

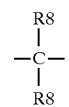
(11)

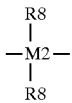 (12)

wherein two $R^8$'s independently represent a hydrogen atom, an alkyl group having 1 to 24 carbon atoms or an aryl, arylalkyl or alkylaryl group having 6 to 24 carbon atoms; and $M^2$ represents a silicon atom, a germanium atom or a tin atom;

the group $R^5$ serves to crosslink $R^3$ and $R^4$; and m represents an integer of 1 to 5;

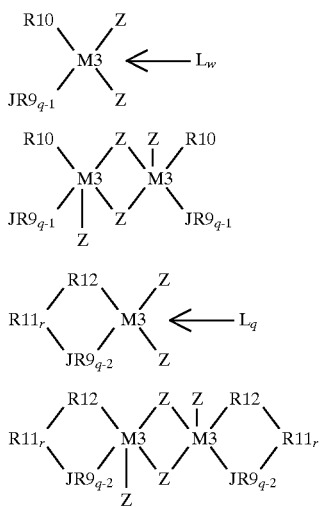

wherein a plurality of $M^3$'s independently represent a titanium atom, a zirconium atom or a hafnium atom; a plurality of Z's independently represent a hydrogen atom, a halogen atom, an alkyl group having 1 to 24 carbon atoms or an aryl, arylalkyl or alkylaryl group having 6 to 24 carbon atoms; L represents a Lewis base; w represents a number of from 0 to 3; $JR^9_{q-1}$ and $JR^9_{q-2}$ each represent a hetero atom ligand, in which J represents a Group 15 element having a coordination number of 3 or a Group 16 element having a coordination number of 2; a plurality of $R^9$'s independently represent a hydrogen atom, a halogen atom, an alkyl or alkoxy group having 1 to 24 carbon atoms or an aryl, aryloxy, arylalkyl, arylalkoxy, alkylaryl or alkylaryloxy group having 6 to 24 carbon atoms; and q represents the coordination number of the element J; $R^{10}$ represents a ligand represented by formula (17), (18), (19) or (20):

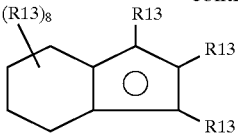 (17)

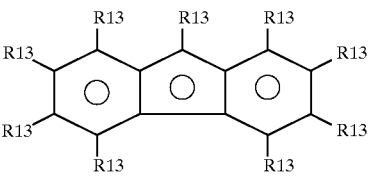 (18)

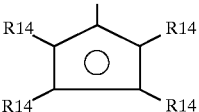 (19)

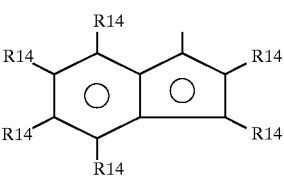 (20)

wherein a plurality of $R^{13}$'s independently represent a hydrogen atom, an alkyl group having 1 to 24 carbon atoms or an aryl, arylalkyl or alkylaryl group having 6 to 24 carbon atoms;

$R^{12}$ represents a ligand coordinating to $M^3$, which is represented by formula (21), (22), (23) or (24):

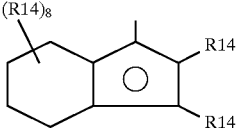 (21)

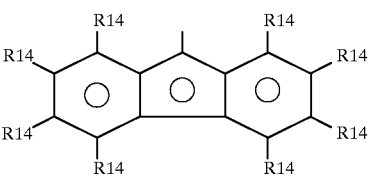 (22)

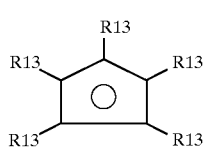 (23)

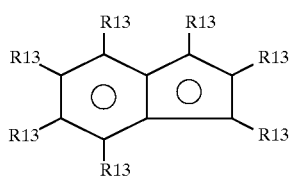 (24)

wherein a plurality of $R^{14}$'s independently represent a hydrogen atom, an alkyl group having 1 to 24 carbon atoms or an aryl, arylalkyl or alkylaryl group having 6 to 24 carbon atoms;

$R^{11}$ represents a group represented by formula (25) or (26):

 (25)

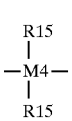 (26)

wherein two $R^{15}$'s independently represent a hydrogen atom, an alkyl group having 1 to 24 carbon atoms or an aryl, arylalkyl or alkylaryl group having 6 to 24 carbon atoms; and $M^4$ represents a silicon atom, a germanium atom or a tin atom;

the group $R^{11}$ serves to crosslink $R^{12}$ and $JR^9_{q-2}$; and r represents an integer of from 1 to 5.

2. The catalyst of claim 1, wherein said cationic component of said ionized ionic compound comprises a Lewis basic functional group containing an element of the Group 15 or 16 of the Periodic Table.

3. The catalyst of claim 1, wherein said anionic component of said ionized ionic compound is an anion containing a boron, aluminum, phosphorus or antimony atom.

4. The catalyst of claim 1, wherein said organometallic compound as component (b) is a compound represented by formula (27):

  (27)

wherein $M^5$ represents an element of the Group 1, 2 or 13 of the Periodic Table, a tin atom or a zinc atom; a plurality of $R^{16}$'s independently represent a hydrogen atom, an alkyl or alkoxy group having 1 to 24 carbon atoms or an aryl, aryloxy, arylalkyl, arylalkoxy, alkylaryl or alkylaryloxy group having 6 to 24 carbon atoms, provided that at least one $R^{16}$ is a hydrogen atom, an alkyl group having 1 to 24 carbon atoms or an aryl, arylalkyl or alkylaryl group having 6 to 24 carbon atoms; and s is an oxidation number of $M^5$.

5. The catalyst of claim 1, wherein the ionized ionic compound is represented by formula (28)

  (28)

wherein [A⁻] is an anionic component of the ionized ionic compound, which forms a stable anion on reaction with a transition metal compound; and [C⁺] is a cationic component of the ionized ionic compound.

6. The catalyst of claim 5, wherein [C⁺] is selected from the group consisting of an ammonium cation, an oxonium cation, a sulfonium cation and a phosphonium cation.

7. The catalyst of claim 1, wherein the carrier is selected from the group consisting of alumina, silica, silica-alumina, silica-magnesia, clay minerals and inorganic halides.

8. A process for producing an olefin polymer comprising polymerizing or copolymerizing an α-olefin and/or a cyclic olefin in the presence of a catalyst for olefin polymerization in a solution, suspension or gas phase at a temperature of −60° to 280° C. under a pressure of 0.5 to 2,000 bar, wherein said catalyst for olefin polymerization is obtained by contacting:

(a) a transition metal compound containing a transition metal of Group 4 of the Periodic Table, (b) an organometallic compound, and (c) a solid catalyst component comprising a carrier and an ionized ionic compound capable of forming a stable anion on reaction with said transition metal compound, wherein said ionized ionic compound comprises a cationic component and an anionic component, wherein said cationic component of said ionized ionic compound is fixed on said carrier through a chemical bond, wherein the solid catalyst component (c) is obtained by the reaction between a solid carrier whose surface has been rendered cationic by chemical modification and the anionic group of the ionized ionic compound, and, wherein said transition metal compound as component (a) is a compound represented by formula (1), (2), (13), (14), (15) or (16):

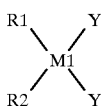  (1)

wherein $M^1$ represents a titanium atom, a zirconium atom or a hafnium atom; a plurality of Y's independently represent a hydrogen atom, a halogen atom, an alkyl group having 1 to 24 carbon atoms or an aryl, arylalkyl or alkylaryl group having 6 to 24 carbon atoms;

$R^1$ and $R^2$ independently represent a ligand represented by formula (3), (4), (5) or (6):

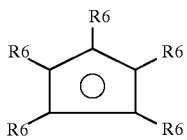  (3)

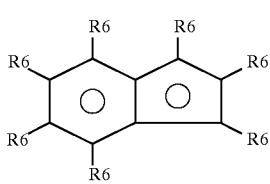  (4)

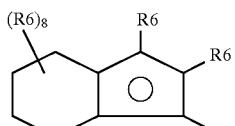  (5)

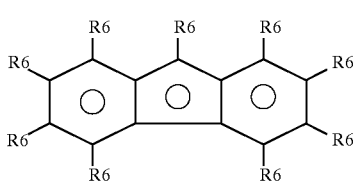  (6)

wherein a plurality of $R^6$'s independently represent a hydrogen atom, an alkyl group having 1 to 24 carbon atoms or an aryl, arylalkyl or alkylaryl group having 6 to 24 carbon atoms;

the ligands $R^1$ and $R^2$ forms a sandwich structure together with $M^1$;

$R^3$ and $R^4$ independently represent a ligand represented by formula (7), (8), (9) or (10):

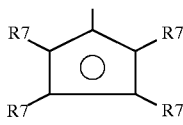  (7)

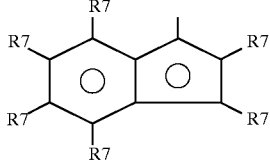  (8)

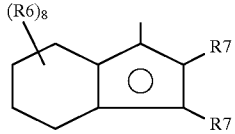  (9)

-continued

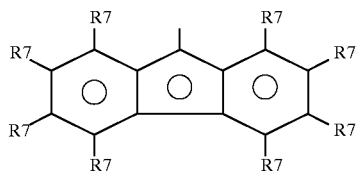
(10)

wherein a plurality of $R^7$'s independently represent a hydrogen atom, an alkyl group having 1 to 24 carbon atoms or an aryl, arylalkyl or alkylaryl group having 6 to 24 carbon atoms;

the ligands $R^3$ and $R^4$ form a sandwich structure together with $M^1$; $R^5$ represents a group represented by formula (11) or (12):

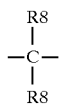
(11)

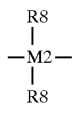
(12)

wherein two $R^8$'s independently represent a hydrogen atom, an alkyl group having 1 to 24 carbon atoms or an aryl, arylalkyl or alkylaryl group having 6 to 24 carbon atoms; and $M^2$ represents a silicon atom, a germanium atom or a tin atom;

the group $R^5$ serves to crosslink $R^3$ and $R^4$; and m represents an integer of 1 to 5;

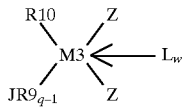
(13)

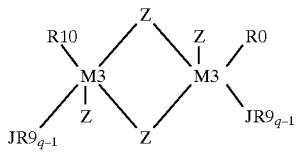
(14)

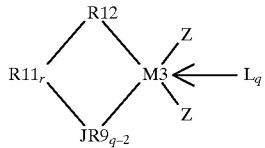
(15)

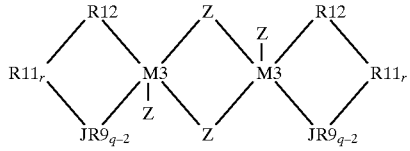
(16)

wherein a plurality of $M^3$'s independently represent a titanium atom, a zirconium atom or a hafnium atom; a plurality of Z's independently represent a hydrogen atom, a halogen atom, an alkyl group having 1 to 24 carbon atoms or an aryl, arylalkyl or alkylaryl group having 6 to 24 carbon atoms; L represents a Lewis base; w represents a number of from 0 to 3; $JR^9_{q-1}$ and $JR^9_{q-2}$ each represent a hetero atom ligand, in which J represents a Group 15 element having a coordination number of 3 or a Group 16 element having a coordination number of 2; a plurality of $R^9$'s independently represent a hydrogen atom, a halogen atom, an alkyl or alkoxy group having 1 to 24 carbon atoms or an aryl, aryloxy, arylalkyl, arylalkoxy, alkylaryl or alkylaryloxy group having 6 to 24 carbon atoms; and q represents the coordination number of the element J; $R^{10}$ represents a ligand represented by formula (17), (18), (19) or (20):

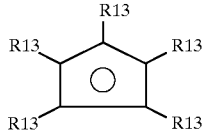
(17)

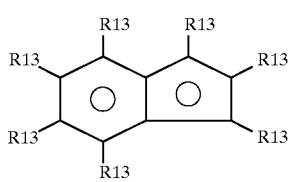
(18)

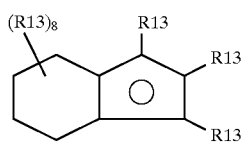
(19)

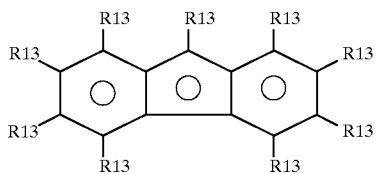
(20)

wherein a plurality of $R^{13}$'s independently represent a hydrogen atom, an alkyl group having 1 to 24 carbon atoms or an aryl, arylalkyl or alkylaryl group having 6 to 24 carbon atoms;

$R^{12}$ represents a ligand coordinating to $M^3$, which is represented by formula (21), (22), (23) or (24):

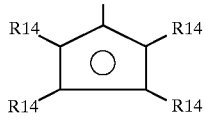
(21)

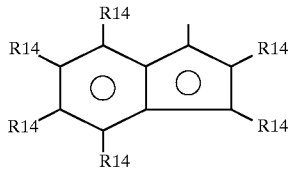
(22)

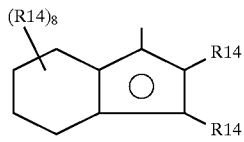
(23)

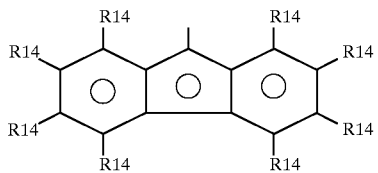
(24)

wherein a plurality of $R^{14}$'s independently represent a hydrogen atom, an alkyl group having 1 to 24 carbon atoms or an aryl, arylalkyl or alkylaryl group having 6 to 24 carbon atom;

$R^{11}$ represents a group represented by formula (25) or (26):

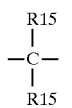 (25)

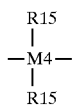 (26)

wherein two $R_{15}$'s independently represent a hydrogen atom, an alkyl group having 1 to 24 carbon atoms or an aryl, arylalkyl or alkylaryl group having 6 to 24 carbon atoms; and $M^4$ represents a silicon atom, a germanium atom or a tin atom;

the group $R^{11}$ serves to crosslink $R^{12}$ and $JR^9_{q-2}$; and r represents an integer of from 1 to 5.

* * * * *